May 1, 1962     E. COHEN     3,032,714
STABILIZED TIMING CIRCUIT
Filed April 14, 1959     4 Sheets-Sheet 1

INVENTOR
E. COHEN
BY Harry C. Hart
ATTORNEY

May 1, 1962 E. COHEN 3,032,714
STABILIZED TIMING CIRCUIT
Filed April 14, 1959 4 Sheets-Sheet 2

INVENTOR
E. COHEN
BY
Harry C. Hart
ATTORNEY

May 1, 1962 E. COHEN 3,032,714
STABILIZED TIMING CIRCUIT
Filed April 14, 1959 4 Sheets-Sheet 3

INVENTOR
E. COHEN
BY
Harry C. Hart
ATTORNEY

May 1, 1962 E. COHEN 3,032,714
STABILIZED TIMING CIRCUIT
Filed April 14, 1959 4 Sheets-Sheet 4

INVENTOR
E. COHEN
BY
Harry C. Hart
ATTORNEY

United States Patent Office 3,032,714
Patented May 1, 1962

3,032,714
STABILIZED TIMING CIRCUIT
Ezra Cohen, Brooklyn, N.Y., assignor to Bell Telephone Laboratories, Incorporated, New York, N.Y., a corporation of New York
Filed Apr. 14, 1959, Ser. No. 806,287
14 Claims. (Cl. 324—68)

This invention deals with timing networks and more particularly with timing circuits requiring substantially fixed sources of supply voltage.

A wide variety of circuits is employed for the measurement of time intervals in communication systems and in electronic control equipment. Generally, such circuits produce voltages that vary with time in a known fashion so that the time interval required to arrive at a preassigned voltage may be predicted. For example, timing circuits frequently employ the unique delay properties of resistor-capacitor combinations or resistor-inductor combinations, commonly known as RC circuits and RL circuits, respectively.

Variations in the supply or biasing potentials in circuits of the type noted above adversely affect the accuracy of such circuits. Although such variations may be controlled within limits that are acceptable in most conventional timing circuits, certain new developments in electronic control equipment and in communication systems have created demands for timing circuit accuracy that requires the complete elimination of or compensation for supply potential variations. For example, a communication system commonly identified as a time assignment speech interpolation system or a TASI system, requires particularly high standards of reliability and accuracy in the performance of timing functions, inasmuch as the proper operation of the entire system is dependent thereon. Such a system is disclosed, for example, in the application of F. A. Saal and I. Welber, Serial No. 686,468, filed September 26, 1957, now Patent No. 2,935,569, issued May 3, 1960. Briefly, a TASI system is designed to increase the capacity of communication channels. When all the channels in a system are assigned, for example, the channels provided by a telephone cable, additional subscribers may be accommodated by assigning to them the channels of parties who are not actually talking at that time. The switching operations required in searching for an unused channel, in assigning a second talker to that channel when the first or originally assigned talker is silent, and in providing a channel to the first talker when his demand for it is renewed are accomplished automatically. Timing circuits are employed to initiate many of these operations. For example, a timing circuit is used to time the transmission period for a disconnect signal. Obviously, for such a system to operate properly all of the timing circuits employed must operate reliably and accurately. Moreover, it is essential that these circuits perform their assigned duties under the most severe environmental conditions. A further requirement for such timing circuits is operation under emergency power conditions when voltage supplies are not regulated.

One approach toward providing a timing circuit designed to meet the requirements noted was presented in my earlier application, Serial No. 753,822, filed August 7, 1958, now Patent No. 2,976,487, issued March 21, 1961. While the timing circuit described in the cited application effectively meets these requirements, certain refinements in TASI systems and in other control equipment have created additional requirements which are not met by known devices. For example, in one timing arrangement, it is desirable to employ a timing circuit which may readily be adapted to either relatively brief or relatively long timing intervals and hence, the design of the circuit must be such that direct coupling to the output circuits may be employed, rather than capacitive coupling. Further, to reduce the complexity of the circuit to a minimum, it is desirable to eliminate separate compensating or balancing networks and arrange the elements of the basic timing circuit in a fashion which enables these elements to perform dual operations, i.e., measuring a time interval and compensating for fluctuations in supply potentials. Still further, it is desirable to increase to a maximum the abruptness of the change in the current flow in the circuit at the termination of the timing interval in order to ensure reliability under a variety of operating conditions.

It is therefore a general object of this invention to provide an improved timing circuit which meets the additional requirements noted above.

It is a more specific object of this invention to provide a timing circuit with improved reliability, without resort to auxiliary circuit arrangements, which is capable of measuring time intervals over a relatively wide range independent of variations in supply voltages.

These and other objects of the invention are realized in apparatus including two like networks comprising, respectively, a first and a second combination of circuit or current carrying elements, each including an element or elements of a first kind and an element or elements of a second kind. Each of these combinations also includes what may be termed a reference point or control point, which, in each of the illustrative forms of the invention discussed below, is a junction point between two or more of the circuit elements. At the inception of a timing interval, the two circuit combinations, together with a pair of supply potentials operate to apply a changing voltage to each control point. While the wave forms of the two changing voltages are dissimilar, since they are dependent on different functions of the supply potentials, they both vary in the same fashion with time. Where the two changing voltages are $V_1$ and $V_2$, respectively, where the two supply potentials are $E_1$ and $E_2$, respectively, and where the time function is designated $f(t)$, the wave forms of the changing voltages at the two control points of a circuit embodying the principles of the invention follow the relations $$V_1(t) = F_1(E_1, E_2) + [F_2(E_1, E_2) - F_1(E_1, E_2)] \cdot f(t) \quad (1)$$
$$V_2(t) = F_2(E_1, E_2) + [F_1(E_1, E_2) - F_2(E_1, E_2)] \cdot f(t) \quad (2)$$

where $t$ is time, where $F_1$ and $F_2$ are functions solely dependent on one or both supply potentials, and where $f(t)$ is a time function solely dependent on the magnitude and kind of circuit elements employed. In accordance with the invention, an additional requirement for the wave forms defined by Equations 1 and 2 is that they intersect at some time $t=T$ after the inception of the timing interval, and further, that the time T be completely independent of the particular magnitudes of the supply potentials at the inception of the timing interval. That T is independent of the supply potentials may be demonstrated in the general form of the invention defined by Equations 1 and 2 by a simultaneous equation solution for $f(T)$, where $f(T)$ is the magnitude of $f(t)$ at time $t=T$. In such a solution, the difference between $V_1(t)$ and $V_2(t)$ may be shown as zero, since the equations are being solved at time T when the wave forms pass through a common point.

It is, of course, apparent from an independent examination of either Equation 1 or Equation 2 that in either case the time required for the wave form to reach any preassigned voltage is necessarily dependent on the supply potentials. In accordance with the invention, however, it is the simultaneous employment of both wave forms which serves to establish a timing interval whose duration is immune to the particular magnitudes of the supply potentials.

The nature of the wave forms defined above may also be described in terms of the change in the voltage difference between the two control points which takes place during the timing interval. For example, at time $t=T$ the changing potential difference instantaneously passes through a point of zero magnitude, which is to say that at time $t=T$ a reversal in relative polarity takes place between the two control points.

At the time of relative polarity reversal described above, or at the time when the wave forms defined by Equations 1 and 2 intersect, current flow between the two control points, when interconnected by an appropriate output circuit, changes abruptly. In accordance with a further principle of the invention, the output circuit which interconnects the control points, and which is responsive to current change, is employed to generate an output signal marking the termination of the timing interval, or the current change may be used directly to operate a utilization device such as a relay, for example. Additionally, the timing circuit is coupled directly, rather than capacitively, to the output circuit. Hence, the invention may be employed with equal advantage for the measurement of relatively brief and relatively long timing intervals.

The invention is not restricted to any particular circuit configuration but instead may take various forms. For example, one form of the invention employs a first RC circuit in series relation connecting a first source of supply potential to a point maintained at a reference potential and a second similar RC circuit connecting a second source of supply potential to the last named point. The reference potential may, for example, be ground potential. The first and the second control points are the resistor-capacitor junction points in the two RC circuits.

Initially, the second potential source is applied directly to the first control point and the first potential source is applied directly to the second control point. At the inception of the timing interval, a switch operates abruptly to open the connecting paths between the first potential source and the second control point and between the second potential source and the first control point. It is at this instant that the potential changes defined by Equations 1 and 2 are initiated. An output path from each of the control points is provided and each output path includes a device which is sensitive to the reversal in polarity which takes place between the two control points at time $t=T$. These devices may advantageously be diodes arranged in opposite polarity relation. The output of the two diodes is then applied to a current sensitive device, such as a multivibrator, for example, which operates to produce an output pulse signaling the termination of the timing interval.

Another form of the invention employs a pair of RL circuits arranged in a circuit configuration similar to the RC circuit pair described above. The well-known delay properties of the RL circuits are employed to produce timing waves which also conform to Equations 1 and 2. The measurement of timing intervals may then be effected by the same means employed in the RC form of the invention.

Still another form of the invention employs a single capacitor bridged between two resistors with the free terminals of each resistor being connected to a respective one of the two sources of supply potential. In this instance, the two control points are the terminals of the capacitor.

In each of the illustrative forms of the invention described thus far, waves of exponential form are employed as a means of measuring intervals of time. However, a circuit generating waves of linear form may also be employed within the scope of the invention. For example, another form of the inventoin employs the delay properties of capacitors or inductors but the characteristic exponential outputs are modified by an auxiliary circuit so that the form of each of the waves serving as the basis for the timing operation is linear.

In a specific embodiment of the invention, a two-transistor switch responsive to an input pulse at the inception of the timing interval is employed as an input circuit. The timing circuit comprises the resistor-capacitor-resistor series combination described above as one form of the invention, an output circuit comprising a pair of blocking diodes, a pair of amplifying transistors, and a multivibrator circuit.

In all forms or embodiments of the invention, the generated wave forms conform to Equations 1 and 2, as described, and the duration of the timing interval is independent of the magnitude of the supply potentials.

One feature of my invention, therefore, is a timing circuit which may be employed over a relatively wide range of timing intervals and which is immune to variations in the circuit biasing voltages of the power supply.

An additional feature of my invention is a timing circuit in which the circuit elements which determine the characteristic timing interval also act to compensate for the effect on the duration of the timing interval of variations in the supply voltages.

The invention, together with additional objects and features thereof, will be fully apprehended from a consideration of the following detailed description of an illustrative embodiment and the accompanying drawings in which.

Figure 1A:
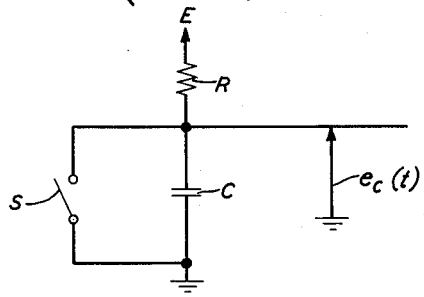
FIG. 1A is a schematic circuit diagram of an RC timing circuit with a single source of operating potential.
Figure 1B:
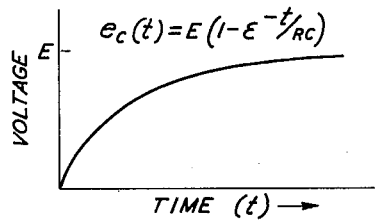
FIG. 1B is a plot of a characteristic output wave form of the circuit of FIG. 1A.
Figure 2A:
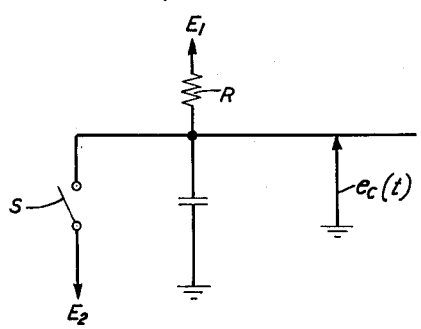
FIG. 2A is a schematic circuit diagram of an RC timing circuit with two sources of operating potential.
Figure 2B:
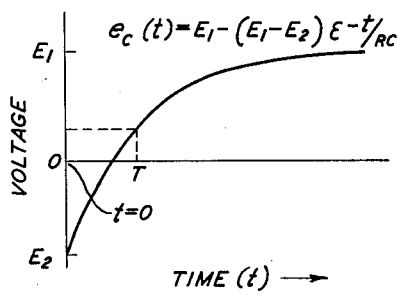
FIG. 2B is a plot of a characteristic output wave form of the circuit of FIG. 2A.

It is well known that if a voltage E is applied to a simple RC circuit, as shown in FIG. 1A, and if the switch S, theretofore closed, is opened at $t=0$, the changing voltage $e_c(t)$ across the capacitor is defined by the curve and the time function expression shown in FIG. 1B. Similarly well known is the action of a simple RC circuit with two applied voltages; for example, $E_1$ and $E_2$ as shown in FIG. 2A, where as a matter of engineering design, ground is interposed between the two voltages. The voltage rise across the capacitor from $E_2$ toward $E_1$, when the switch S, theretofore closed, is opened at time $t=0$, is defined by the wave form and by the time function expression shown in FIG. 2B. In the case of either circuit, the time T at which a particular capacitor voltage is reached is determined by the applied voltages or operating potentials $E_1$ and $E_2$, and a change in either or both necessarily results in a change in the duration of the interval between $t=0$ and $t=T$.

Figure 3A:
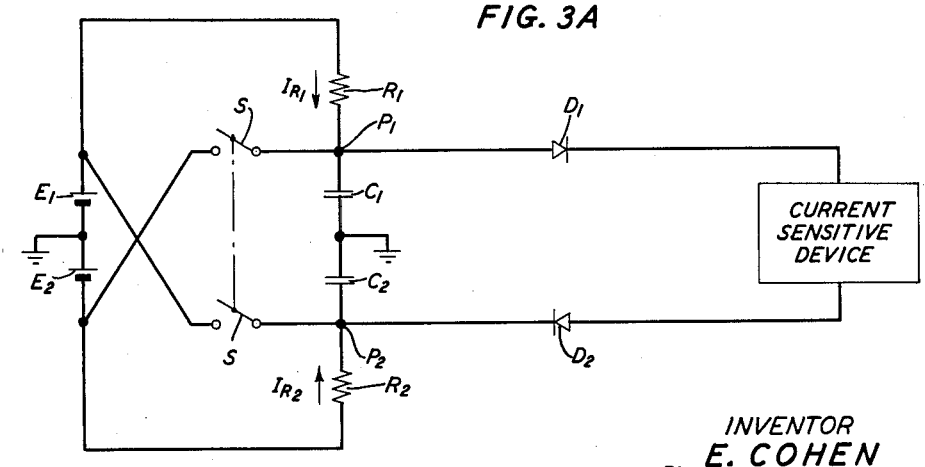
FIG. 3A is a schematic circuit diagram including a pair of RC circuits arranged in accordance with the invention.

FIG. 3A shows a timing network in accordance with the invention including a first RC circuit comprising resistor $R_1$ and capacitor $C_1$ and a second RC circuit comprising resistor $R_2$ and capacitor $C_2$ with the two circuits interconnecting two sources of supply potential $E_1$ and $E_2$, respectively. A switch S, when closed, connects the point $P_1$ to $E_2$ and similarly connects the point $P_2$ to the potential source $E_1$. The output circuit from the common points $P_1$ and $P_2$ includes oppositely poled diodes $D_1$ and $D_2$ and a current sensitive device, which may be a multivibrator, for example.

Examining the operation of the circuit of FIG. 3A, the switch S is initially closed and, accordingly, the point $P_1$ is at potential $E_2$ and the point $P_2$ is at potential $E_1$. At time $t=0$ the switch S is opened, the voltage at point $P_1$ commences to change from $E_2$ toward $E_1$, and the potential at $P_2$ commences to change from $E_1$ toward $E_2$, as shown by the solidly drawn wave forms in FIG. 3B. The equation of the changing voltage $V_1$ at point $P_1$ is well known to be $$V_1(t) = E_1 + (E_2 - E_1)\epsilon^{-t/R_1C_1} \qquad (3)$$

and the equation of the changing voltage at point $P_2$ is $$V_2(t) = E_2 + (E_1 - E_2)\epsilon^{-t/R_2C_2} \qquad (4)$$

It is apparent that if the product of the magnitudes of resistor $R_1$ and capacitor $C_1$ is equal to the product of the magnitudes of resistor $R_2$ and capacitor $C_2$, then $f(t)$ in Equation 3, $\epsilon^{-t/R_1C_1}$, is identical to $f(t)$ in Equation 4, $\epsilon^{-t/R_2C_2}$, and, moreover, the two equations, respectively, are specific forms of general expressions for the wave forms of the invention as defined by Equations 1 and 2.

Figure 3B:
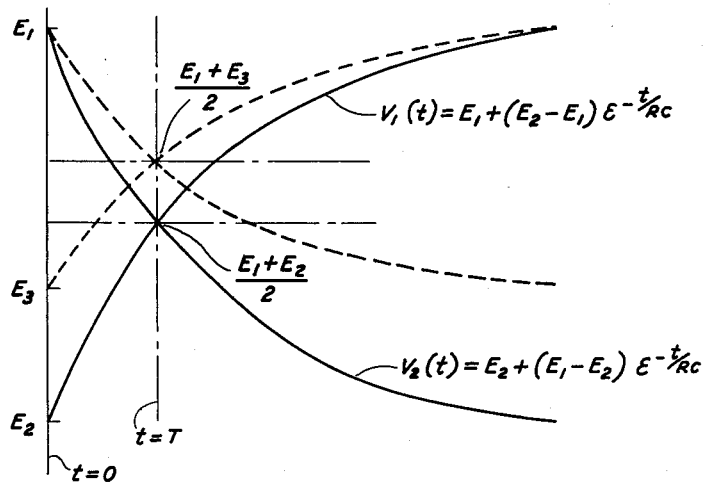
FIG. 3B is a plot of the output voltage wave forms of the circuit of FIG. 3A.
Figure 3C:
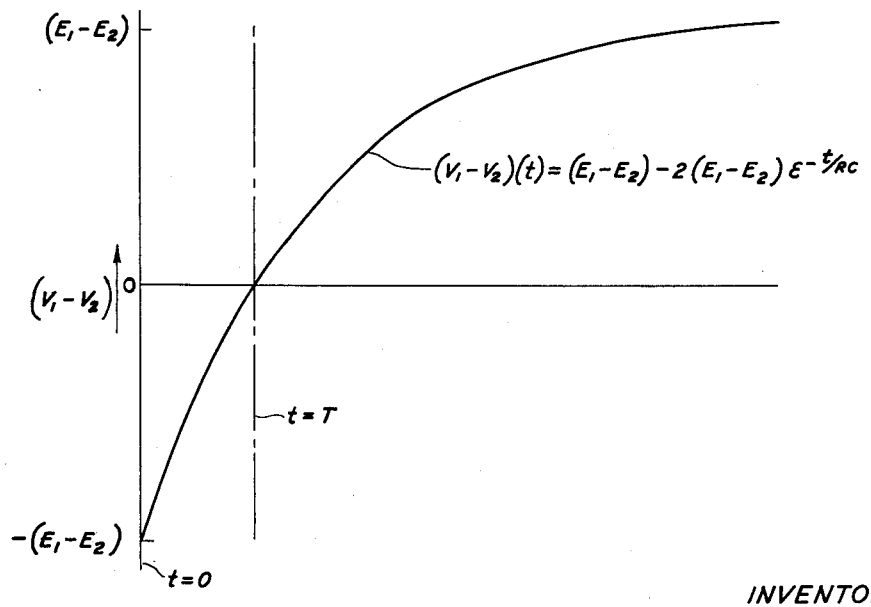
FIG. 3C is a potential difference plot of the wave forms of FIG. 3B.

The relationship of the wave forms illustrated as solidly drawn curves in FIG. 3B is further illustrated in FIG. 3C which shows a plot of the changing potential difference between points $P_1$ and $P_2$. The expression for the difference curve is simply the difference between Equations 3 and 4, or $$(V_1 - V_2)(t) = (E_1 - E_2) - 2(E_1 - E_2)\epsilon^{-t/RC} \qquad (5)$$

where RC represents the product $R_1C_1$, or the equal product $R_2C_2$.

Referring again to the plot of potential difference shown in FIG. 3C, it will be noted that the curve intersects the axis of zero potential difference at a time which of course coincides with the reversal in relative polarity which takes place between points $P_1$ and $P_2$. Designating this time as T and solving Equation 5 for $t$ at time $t=T$ gives the result $$T = RC \ln 2 \qquad (6)$$

from which it is apparent that the duration of the timing interval in this form of the invention is a constant which is independent of the supply potentials, being determined solely by the magnitudes and kinds of the circuit elements employed.

The immunity of the timing interval to changes in the supply potentials is further illustrated, graphically, in FIG. 3B. For example, if potential $E_2$ is shifted to a potential such as $E_3$, the voltage changes at points $P_1$ and $P_2$ follow, respectively, the courses shown by the two dotted wave forms. In particular, it should be noted that the intersection of the dotted wave forms still occurs at time $t=T$. Although only the effect of a change in the potential $E_2$ is illustrated, it is apparent that the two wave forms of a circuit in accordance with the invention will intersect at time $t=T$ irrespective of changes in either or both of the supply potentials.

Returning now to the operation of the circuitry shown in FIG. 3A, since $E_1$ and $E_2$ are positive and negative potentials, respectively, it is apparent that prior to time T both diodes $D_1$ and $D_2$ are biased in their non-conducting directions. The polarities of $E_1$ and $E_2$ could, of course, be reversed, in which event the diodes $D_1$ and $D_2$ would be poled in directions opposite to those shown. During the timing interval, current flow through the two timing resistors may be expressed, respectively, as follows:

$$I_{R_1}(t) = \frac{E_1 - E_2}{R_1} \cdot \epsilon^{-t/RC} \qquad (7)$$

$$I_{R_2}(t) = \frac{E_2 - E_1}{R_2} \cdot \epsilon^{-t/RC} \qquad (8)$$

At time T, however, the diodes $D_1$ and $D_2$ are instantaneously biased in their forward directions. The impedance of the current-sensitive device is substantially less than the combined resistance of resistors $R_1$ and $R_2$ and, accordingly, the current flow through the resistors and through the output circuit comprising diodes $D_1$ and $D_2$ and the current-sensitive device rises abruptly, to the value $$I_{R_1R_2}(T) = \frac{E_1 - E_2}{R_1 + R_2} \qquad (9)$$

The abruptness of the current change, which is due in part to the shunting effect of the low impedance output circuit across the capacitors, is sufficient to ensure the generation of an output pulse by any conventional current-sensitive device, such as a blocking oscillator or a multivibrator, for example, and the leading edge of the output pulse serves to mark the termination of the timing interval.

Figure 4:
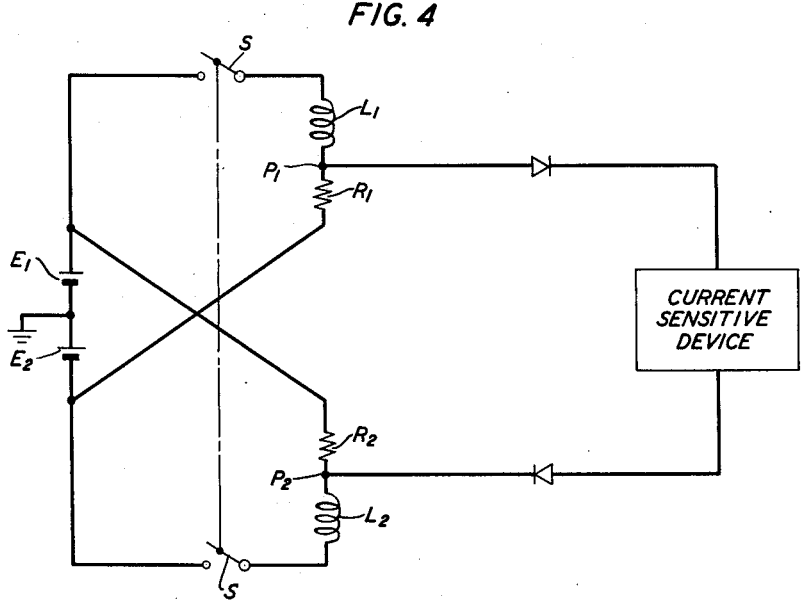
FIG. 4 is a schematic circuit diagram of a pair of RL circuits arranged in accordance with the invention.

Turning now to FIG. 4, substantially the same circuit as illustrated in FIG. 3A is shown with the exception that two RL series circuit combinations are employed in accordance with the invention, in contrast to the two RC combinations of FIG. 3A. In the circuit of FIG. 4, if the switch S, theretofore open, is closed at time $t=0$, the characteristic opposition of an inductor to a change in current flow causes the voltages, $V_1$ and $V_2$, at point $P_1$ and at point $P_2$, respectively, to change exponentially as follows:

$$V_1(t) = E_1 + (E_2 - E_1)\epsilon^{-tR_1/L_1} \qquad (10)$$

$$V_2(t) = E_2 + (E_1 - E_2)\epsilon^{-tR_2/L_2} \qquad (11)$$

Similar to the requirements of the RC form of the invention, the magnitudes of $R_1$ and $R_2$ may differ, as may the magnitudes of $L_1$ and $L_2$, but in order that $f(t)$ may be identical in Equations 10 and 11

$$\frac{L_1}{R_1}$$

must equal $$\frac{L_2}{R_2}$$

Designating these equal quotients by the notation $$\frac{L}{R}$$

subtracting Equation 11 from Equation 10 to obtain an expression for the changing potential difference between points $P_1$ and $P_2$, and solving this expression for $t$ at time $t=T$ gives the result $$T = \frac{L}{R} \ln 2$$

Accordingly, since Equations 10 and 11 are, respectively, particular froms of the general Equations 1, 2 and since the duration of the period between the inception of a timing interval and the intersection of the two wave forms is dependent solely on the magnitudes and kinds of circuit elements, the conclusions drawn for the circuit of FIG. 3A with respect to the immunity of T to changes in $E_1$ and $E_2$ are equally valid for the circuit of FIG. 4.

Figure 5:
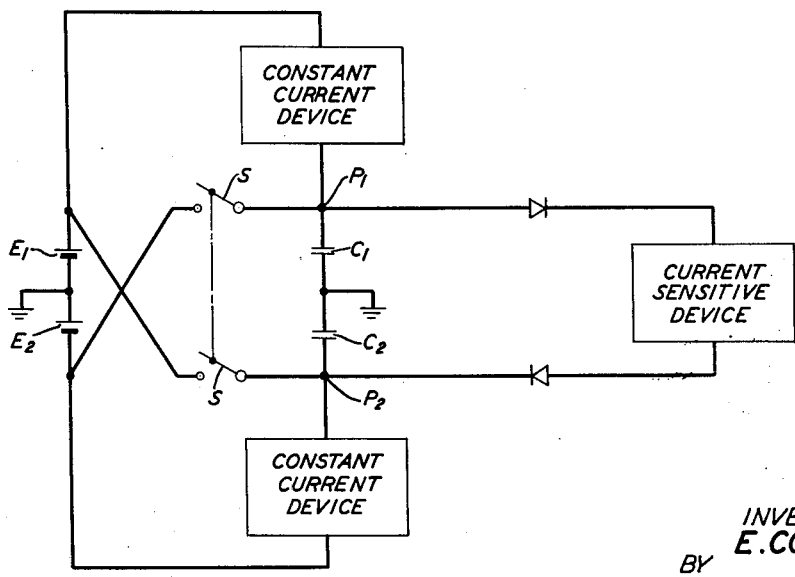
FIG. 5 is a schematic circuit diagram of a form of the invention employing linear outputs.

FIG. 5 shows a circuit arrangement, in accordance with the invention, which operates in a manner similar to that described for the circuits of FIG. 3A and FIG. 4. In FIG. 5, however, a constant-current device, shown schematically, is employed so that the voltage wave forms which develop at points $P_1$ and $P_2$ upon the opening of the switch S change linearly rather than exponentially. Various combinations may be employed to translate exponential voltage wave forms into linear wave forms. For example, the well known "bootstrap" circuit which finds use as a sweep circuit in the television art provides substantially constant current through a resistor by means of a cathode follower arrangement. The current through the timing capacitors is also constant and, hence, the sweep voltage developed is linear. A circuit of this type is shown by Millman and Taub in a standard text, Pulse and Digital Circuits, McGraw-Hill, 1956, page 229. As with the circuits of FIG. 3A and FIG. 4, the expressions for the voltage changes produced by the circuit of FIG. 5 may be shown to conform to Equations 1 and 2. Again, designating the time of relative polarity reversal between points $P_1$ and $P_2$ as T, taking the difference between the two expressions defining voltage change at points $P_1$ and $P_2$ and solving for T at time $t=T$ gives the relation $$T = kC \qquad (13)$$

where $k$ is a constant which is independent of the values of $E_1$ and $E_2$ and C is the magnitude of the equal-magnitude capacitors $C_1$ and $C_2$. Thus, as in the RC and RL forms of the invention, T is independent of changes in the operating potentials, being dependent only on the magnitude and kind of elements selected to produce the wave forms.

Figure 6:
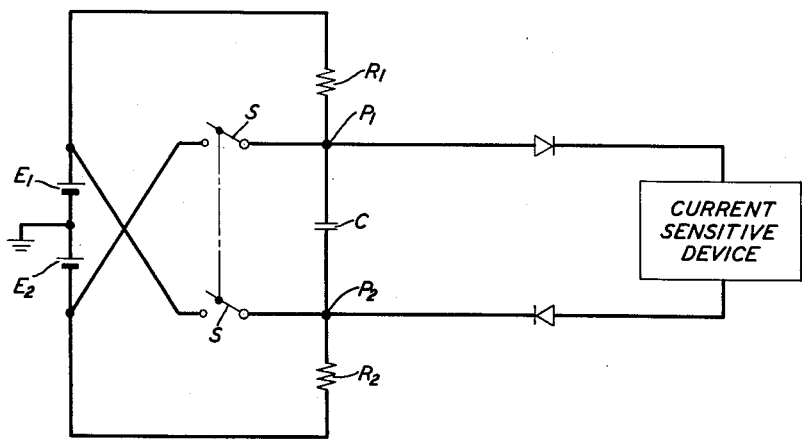
FIG. 6 is a schematic circuit diagram of a form of the invention employing an R—C—R series combination.

The circuit of FIG. 6 illustrates a form of the invention which is closely related to the form illustrated in FIG. 3A. The circuit differs from the circuit of FIG. 3A, however, in that the two capacitors have been replaced by a single capacitor C. In this instance, it will be appreciated that the magnitudes of the resistors $R_1$ and $R_2$ must be equal in order to conform to the requirement that the product of the magnitudes of resistance and capacitance in one branch of the timing circuit must equal the product of the magnitudes of the resistance and capacitance in the second branch of the circuit. Expressions corresponding to Equations 1 and 2 may be developed for the potential changes which take place at points $P_1$ and $P_2$ upon the opening of switch S and again T is independent of changes in the supply potentials since $$T = 2RC \ln 2 \qquad (14)$$

where R is the common magnitude of the resistors $R_1$ and $R_2$ and C represents the magnitude of capacitor C.

In the illustrative forms of the invention described above, the timing wave forms in each case share certain common identifying characteristics in addition to those already noted. For example, in each case the wave forms are symmetrical with respect to an axis defined by $$\frac{E_1 + E_2}{2}$$

and it is on this axis that the wave forms intersect. Further, in each case, at any point in time the respective slopes of the timing wave forms are equal in magnitude but opposite in sign. Other forms of the invention may of course generate timing wave forms with characteristics differing from those noted immediately above since the principles of the invention are valid for any circuit which develops a pair of wave forms defined, respectively, by the general expressions $$V_1(t) = F_1(E_1, E_2) + F_2(E_1, E_2) \cdot f(t) \qquad (1a)$$

$$V_2(t) = F_3(E_1, E_2) + F_4(E_1, E_2) \cdot f(t) \qquad (2a)$$

provided that the wave forms intersect after an interval of time of a duration which is independent of the supply potentials, being determined solely by the magnitudes and kinds of circuit elements employed to produce the wave forms. An additional but obvious restriction on $f(t)$ in Equations 1 and 2 and in Equations 1a and 2a is that it must of course be a monotonically changing function, or at least monotonic within the range of desired timing intervals in order to ensure that during the period $t=0$ to $t=T$ the wave forms intersect only at time T.

Figure 7:
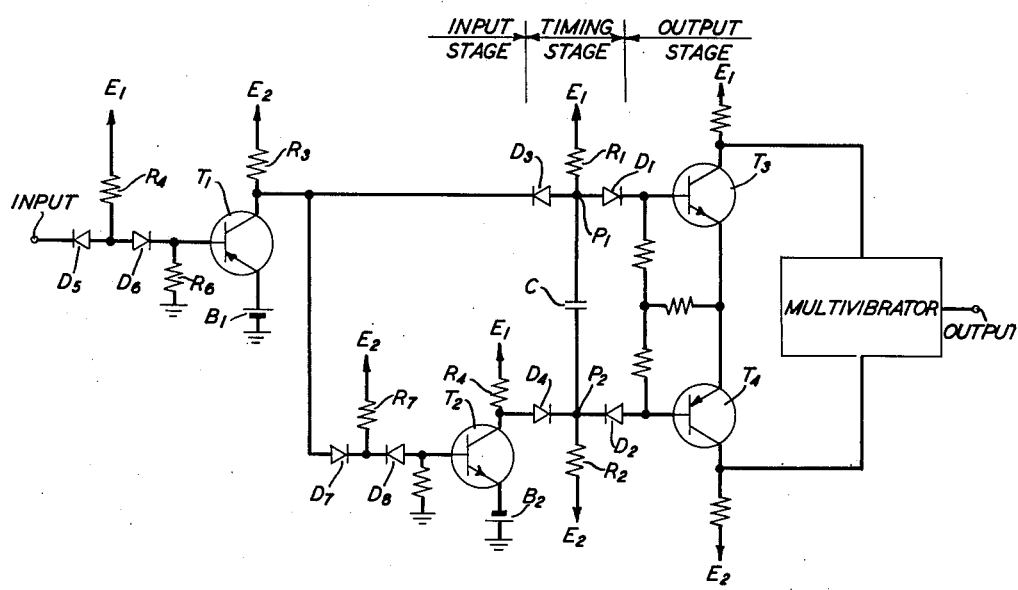
FIG. 7 is a schematic circuit diagram of a complete embodiment of the invention.

FIG. 7 shows a complete embodiment of the invention, employing the invention form illustrated by FIG. 6 in a delay device arrangement which interposes a preassigned time delay between the receipt of an input signal and the generation of an output signal. The embodiment comprises a timing network which includes an input stage, a timing stage and an output stage. The input stage comprises a diode gate, diodes $D_5$ and $D_6$, and two transistor switches $T_1$ and $_2$ in common emitter configuration together with a second gate comprising diodes $D_7$ and $D_8$. Oppositely poled diodes $D_3$ and $D_4$ serve to isolate the input stage from the timing stage. The timing circuit, as shown in FIG. 6, comprises a timing capacitor C bridged between a pair of timing resistors $R_1$ and $R_2$. Oppositely poled diodes $D_1$ and $D_2$ isolate the timing stage from the output stage. The output stage comprises a pair of amplifying transistors $T_3$ and $T_4$ and a multivibrator circuit indicated in block form. Supply potentials $E_1$ and $E_2$ are applied at appropriate points throughout the circuit and for the purpose of the particular embodiment illustrated, $E_1$ is assumed to be a source of positive potential while $E_2$ is a source of negative potential. It will be apparent to persons skilled in the art, however, that by minor design changes the circuit may readily be adapted to employ supply potentials opposite in polarity to those shown, or either supply potential may be ground.

Operation of the circuit is initiated by the application of a positive pulse to the input point which serves to bias diode $D_5$ in the reverse direction. Diode $D_6$ is biased in the forward direction which serves to increase the positive voltage on the base of the P-N-P transistor $T_1$ to the point of cutoff. With transistor $T_1$ in the Off state, its collector goes sufficiently negative, from the potential $E_2$ applied through resistor $R_3$, to back bias diode $D_7$. Diode $D_8$ is in turn biased in the forward direction by the potential $E_2$ acting through resistor $R_7$ which serves to drive the base of the N-P-N transistor $T_2$ sufficiently negative with respect to the biasing potential $B_2$ so that transistor $T_2$ is also turned Off.

The magnitudes of resistors $R_3$ and $R_4$ are substantially smaller than the magnitude of resistor $R_1$ and the magnitudes of resistors $R_1$ and $R_2$ are equal. Accordingly, at this point the voltages on the collectors of transistors $T_1$ and $T_2$ are substantially equal to $E_2$ and $E_1$, respectively. Additionally, neglecting the small voltage drop across diodes $D_3$ and $D_4$, the voltages at points $P_1$ and $P_2$ are substantially equal to $E_2$ and $E_1$, respectively. As a result, both diodes $D_1$ and $D_2$ are back biased and the N-P-N transistor $T_3$ and the P-N-P transistor $T_4$ are held in a non-conducting state.

At a time marked by the trailing edge of the initiating pulse, which time is designated $t=0$, transistors $T_1$ and $T_2$ are turned On by the decrease and increase, respectively, on their base potentials which biases diodes $D_3$ and $D_4$ in their reverse directions. Points $P_1$ and $P_2$ are thereby isolated from potential sources $E_2$ and $E_1$, respectively. The changing potentials, $V_1$ and $V_2$, at points $P_1$ and $P_2$, respectively, follow a course defined by the expressions $$V_1(t) = E_1 + (E_2 - E_1)\epsilon^{-t/2RC} \qquad (15)$$
$$V_2(t) = E_2 + (E_1 - E_2)\epsilon^{-t/2RC} \qquad (16)$$

where R is the magnitude of either of the equal-magnitude resistors $R_1$ and $R_2$. The current flowing in each of the resistors $R_1$ and $R_2$ may be defined as $$I_R(t) = \frac{E_1 - E_2}{R} \epsilon^{-t/2RC} \qquad (17)$$

At a time $t=T$ the voltages at points $P_1$ and $P_2$ reverse in relative polarity which serves to bias diodes $D_1$ and $D_2$ in the forward direction. The current flowing in the circuit increases abruptly to $$I_R(T) = \frac{E_1 - E_2}{2R} \qquad (18)$$

turning transistors $T_3$ and $T_4$ On and the resulting changes in voltage at the collectors of these transistors is applied to an output pulse circuit comprising a multivibrator, as indicated. The leading edge of the pulse appearing at the output point of the multivibrator marks the time $t=T$.

As in the circuit shown in FIG. 6, the duration of the timing interval may be expressed by $$T = 2RC \ln 2 \qquad (14)$$

It is to be understood that the above-described arrangements are illustrative of the application of the principles of this invention. Numerous other arrangements may be designed by those skilled in the art without departing from the spirit and scope of the invention.

What is claimed is:

1. Time interval marking apparatus comprising, in combination, two sources of nominally fixed potentials $E_1$ and $E_2$, two like networks each comprising a resistive element and a reactive element interconnected at a respective reference point, and each connected with one of said sources in such fashion that the rest potentials of said reference points are $E_1$ and $E_2$, respectively, switching means for simultaneously interconnecting each of said networks with the other one of said sources, whereupon the potential of each reference point shifts toward that of the other source following a course that is exactly defined by the difference between the potentials of said sources and the magnitudes of said elements, whereby the interval that elapses between the operation of said switching means and the attainment of like potentials by said reference points is independent of departures of said source potentials from their nominal values.

2. Time interval marking apparatus comprising, in combination, two sources of nominally fixed potentials $E_1$ and $E_2$, two like networks each comprising a resistive element and a reactive element interconnected at a respective reference point and each connected with both of said sources in such fashion that the rest potentials of said reference points are $E_1$ and $E_2$, respectively, switching means for simultaneously disconnecting one of said networks from one of said sources and the other of said networks from the other of said sources, whereupon the potential of each reference point shifts toward the rest potential of the other reference point, following a course that is exactly defined by the difference between the potentials of said sources and the magnitudes of said elements, whereby the interval that elapses between the operation of said switching means and the attainment of like potentials by said reference points is independent of departure of said source potentials from their nominal values.

3. A timing network comprising, in combination, a first source of nominally fixed potential $E_1$ and a second source of nominally fixed potential $E_2$, a first timing circuit comprising at least one current carrying element of a first kind and at least one current carrying element of a second kind defining a first control point, a second timing circuit comprising at least one current carrying element of a first kind and at least one current carrying element of a second kind defining a second control point, first means including at least one element of said first kind connecting said first control point to said first potential source, second means including at least one element of said first kind connecting said second control point to said second potential source, third means connecting said first point to said second potential source and said second point to said first potential source, means operative abruptly at the inception of a preassigned timing interval of duration T for disabling said third connecting means whereupon the potentials $V_1$ and $V_2$ at said first and second points, respectively, proceed to change as time advances, following courses given by the relations $$V_1(t) = F_1(E_1, E_2) + [F_2(E_1, E_2) - F_1(E_1, E_2)] \cdot f(t)$$
$$V_2(t) = F_2(E_1, E_2) + [F_1(E_1, E_2) - F_2(E_1, E_2)] \cdot f(t)$$

in which the functions $F_1$ and $F_2$ depend only on said potentials $E_1$ and $E_2$, while $f(t)$ depends on the magnitudes and kinds of said elements, whereupon the wave forms defined by said relations intersect at the termination of said preassigned timing interval, the duration of said interval being independent of the magnitudes of $E_1$ and $E_2$, whereby the relative polarities of the potentials at said points reverse at the termination of said preassigned timing interval irrespective of the magnitudes of $E_1$ and $E_2$, and means responsive to said reversal in polarity for marking the termination of said timing interval.

4. Apparatus as defined in claim 3 wherein said first circuit comprises a first resistive element and a first reactive element bridged between said first potential source and a point maintained at a reference potential, and wherein said second circuit comprises a second resistive element and a second reactive element bridge between said second potential source and said last named point, said first and second control points being defined, respectively, by the junction of said first resistive and first reactive elements and the junction of said second resistive and second reactive elements.

5. Apparatus as defined in claim 4 wherein said reactive elements comprise capacitors.

6. Apparatus as defined in claim 3 wherein the combination of said first and second circuits comprises a first resistive element, a capacitive element and a second resistive element in series relation bridged between said first potential source and said second potential source, said first and second control points being defined, respectively, by the junction of said first resistive element and said capacitive element and the junction of said second resistive element and said capacitive element.

7. In a timing circuit including an input point, first and second output points, and first and second sources of nominally fixed potential with magnitudes of $E_1$ and $E_2$, respectively, in combination, means operative at the inception of a preassigned timing interval of duration T for simultaneously applying a first changing potential $V_1(t)$ to said first output point and a second changing potential $V_2(t)$ to said second output point, said changing potentials being defined, respectively, by the relations $$V_1(t) = F_1(E_1, E_2) + [F_2(E_1, E_2) - F_1(E_1, E_2)] \cdot f(t)$$
$$V_2(t) = F_2(E_1, E_2) + [F_1(E_1, E_2) - F_2(E_1, E_2)] \cdot f(t)$$

wherein the functions $F_1$ and $F_2$ are solely dependent on the magnitudes of said nominally fixed potentials and wherein $f(t)$ is solely dependent on the magnitudes and kinds of said elements, said changing potentials being further defined by the intersection of their respective associated wave forms on the axis defined by $$\frac{E_1 + E_2}{2}$$

whereby the relative polarities at said output points reverse at the termination of said preassigned timing interval, irrespective of the magnitudes of said nominally fixed potentials, and means responsive to said polarity reversal for generating a signal marking the termination of said timing interval.

8. Apparatus as defined in claim 7 wherein said changing-potential applying means comprises a first resistive element and a first reactive element in series relation bridged between said first potential source and a point maintained at a reference potential, a second resistive element and a second reactive element in series relation bridged between said second potential source and said last named point, said output points being defined, respectively, by the junction of said first resistive and first reactive elements and the junction of said second resistive and second reactive elements, means connecting said second potential source to said first output point and said first potential source to said second output point, and means operative at the inception of said timing interval for disabling said connecting means.

9. Apparatus as defined in claim 7 wherein said changing-potential applying means comprises a first resistive element, a capacitive element and a second resistive element in series relation bridged between said first and second potential sources, said output points being defined, respectively, by the junctions of said capacitive element with said resistors, means connecting said second potential source to said first output point and said first potential source to said second output point, and switching means operative at the inception of said timing interval for disabling said connecting means.

10. Apparatus as defined in claim 9 wherein said disabling means comprises a pair of transistor switches.

11. Apparatus as defined in claim 10 including a first pair of oppositely poled diodes isolating said switches from said output points.

12. Apparatus as defined in claim 11 including a second pair of oppositely poled diodes isolating said output points from said signal generating means.

13. A timing network including a first and a second control point, and a first and a second pair of sources of operating potential of unlike magnitude comprising, in combination, a first reactive element and a first resistive element in series relation, the junction of said elements defining said first control point, means connecting the free terminal of said first resistive element to said first potential source, a second reactive element and a second resistive element in series relation, the junction of said second elements defining said second control point, the quotient of the magnitudes of said first elements being equal to the quotient of the magnitudes of said second elements, means connecting the free terminal of said second resistive element to said second potential source means operative at the inception of a preassigned timing interval for connecting the free terminal of said first reactive element and the free terminal of said second reactive element to said second and first potential sources, respectively, whereupon, at the inception of said timing interval, the potentials at said control points proceed to change as time advances, reaching a common potential of a magnitude equal to one-half the sum of the magnitudes of said operating potentials at the termination of said timing interval, the duration of said interval being independent of the magnitudes of said operating potentials, whereupon, at the termination of said timing interval, the potentials at said control points reverse their relative polarities, and a utilization device responsive to said relative polarity reversal interconnecting said control points.

14. A timing network including an input point, a first and a second control point, first and second sources of nominally fixed operating potential of magnitudes $E_1$ and $E_2$, respectively, and an output point, said network comprising, in combination, a capacitor of magnitude C, means including a first resistor of magnitude R connecting one terminal of said capacitor to said first source of operating potential, means including a second resistor of magnitude R connecting the other terminal of said capacitor to said second source of operating potential, said first and second operating points being defined respectively by the junction of said capacitor and said first resistor and the junction of said capacitor and said second resistor, means connecting said first source of operating potential to said second control point and said second source of operating potential to said first control point, means responsive to an input signal applied to said input point at the inception of a timing interval of a preassigned duration T for disabling said connecting means, whereupon, at the inception of said timing interval, the voltages at said control points proceed to change as a preassigned function of time, said voltages reversing in relative polarity at the termination of said timing interval, said duration being defined by the relation $$T = 2RC \ln 2$$

whereby said preassigned timing interval is independent of the magnitudes of said operating potentials, being dependent solely on the magnitudes of said resistors and capacitor and a predetermined constant, and means responsive to said relative reversal in polarity for applying a signal to said output point to mark the termination of said timing interval.

References Cited in the file of this patent

UNITED STATES PATENTS

| | | |
|---|---|---|
| 1,841,983 | Ruhlemann | Jan. 19, 1932 |
| 2,636,931 | Krom | Apr. 28, 1953 |

OTHER REFERENCES

"Precision Interval Timer," by Sidney Wald, Electronics, December 1948, pages 88, 89.